Aug. 24, 1954
W. S. PRAEG
2,686,956
BUILT-UP GEAR SHAVING CUTTER
Filed March 17, 1952
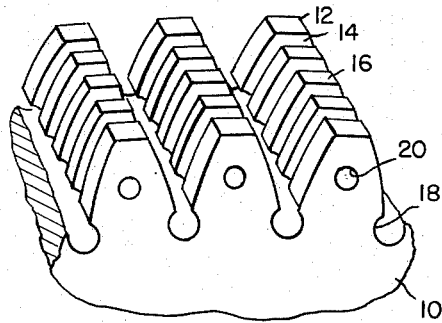
FIG.1.
FIG.2.
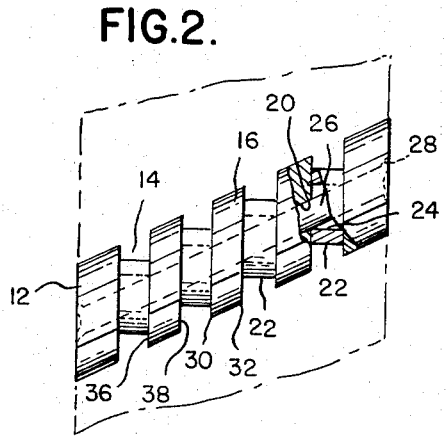
FIG.3.
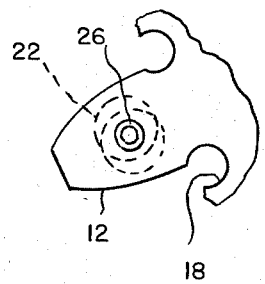
FIG.4.
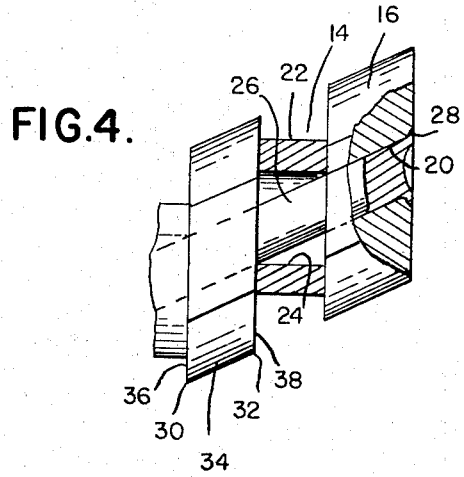
FIG.5.
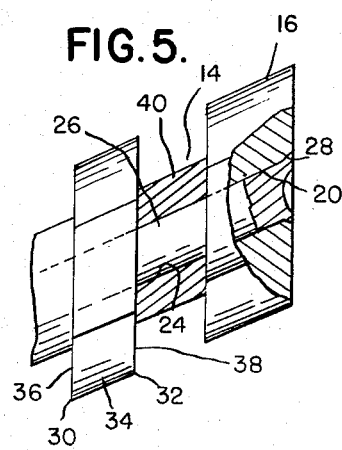
INVENTOR.
WALTER S. PRAEG
BY *Whittemore,*
*Hulbert & Belknap*
ATTORNEYS

Patented Aug. 24, 1954

2,686,956

UNITED STATES PATENT OFFICE 2,686,956

BUILT-UP GEAR SHAVING CUTTER

Walter S. Praeg, Detroit, Mich., assignor to National Broach & Machine Company, Detroit, Mich., a corporation of Michigan Application March 17, 1952, Serial No. 276,909

8 Claims. (Cl. 29—103)

The present invention relates to built-up gear shaving cutters and has for its object to provide a gear shaving cutter having teeth provided with serrations in which the intersection between the side walls of the serrations and the outer surfaces of the teeth provide cutting edges, and in which the side walls of the serrations are ground surfaces.

It is a feature of the present invention to provide a gear shaving cutter having teeth which are slotted and in which the tooth portions intermediate the slots are reinforced by washers assembled with a pin extending longitudinally of each tooth.

Other objects and features of the invention will become apparent as the description proceeds, especially when taken in conjunction with the accompanying drawings, wherein:

Figure 1 is a fragmentary view of a gear shaving cutter constructed in accordance with the present invention.

Figure 2 is a fragmentary enlarged plan view of a cutter looking radially inwardly on a single tooth of the cutter.

Figure 3 is an end view of the structure shown in Figure 2.

Figure 4 is an enlarged fragmentary view, partly in section, of a cutter tooth.

Figure 5 is a view similar to Figure 4 illustrating a modified form of washer.

Gear shaving cutters adapted to shave the surfaces of the teeth of a gear by running in mesh with the gear with the axes of the gear and cutter crossed at a small angle are known and reference is made to Drummond Patent 2,126,178 for a full description of cutters of this general type.

In the past these cutters have been produced by serrating the teeth of the cutter to provide grooves or serrations running generally up and down the teeth which provide cutting edges at the intersection between the sides of the serrations and the tooth surface. These serrations have been produced by a cutting operation prior to hardening the teeth of the cutter and therefore the sides of the serrations have in general been somewhat irregular and rough. It has been found that substantially improved results are obtained when the cutting edges are produced by the intersection of two ground surfaces and this is accomplished in the present invention.

Referring now to the figures, Figure 1 illustrates a fragment of a cutter 10 having teeth 12 provided with serrations or spaces 14 between toothed segments or blade portions 16. Cutters in accordance with the present invention are produced by hobbing high speed steel to produce a gear-like member having the teeth 12, thereafter drilling the blank to provide the transverse holes 18 and holes 20 which extend longitudinally through the teeth. The cutter is thereafter hardened and the teeth are thereafter ground to provide the slots 14, which in this case are ground completely through the teeth. This operation may take place by circular grinding so that the slots 14 extend in a circular series disposed circumferentially of the gear.

This has the effect of leaving a plurality of independent toothed blade portions 16 which as will be evident, are not adequately supported for gear finishing operation.

In order to provide the support necessary for the tooth blade portions 16, washers 22 are provided which may be of cylindrical shape having a central cylindrical opening 24 therethrough. The washers 22 are assembled in end abutting relation between adjacent toothed blade portions 16 and are retained in assembled relation by a transversely extending pin 26. In the case of helical teeth it will be observed that the washers 22 are disposed with their axes parallel to the axis of the gear and the central opening 24 through the washers is of sufficient size to receive the pins 26 in oblique relation relative thereto, as clearly evident in Figure 4. Inasmuch as the washers 22 are for the primary purpose of providing support for the toothed blades 16 against lateral displacement, it is unnecessary for the openings 24 in the pins 26 to be fitted with any high degree of accuracy to the pins.

Preferably, the end blades of the cutter tooth as illustrated in Figure 4, are substantially wider than intermediate blades and the pin receiving opening 20 is countersunk as indicated at 28 to permit peening or staking the end of the pin 26, as clearly illustrated in Figure 4.

While satisfactory results are obtainable by employing washers 22 which are cylindrical in outer configuration, it will be appreciated of course that if desired the washers may have an outer configuration generally equivalent to the transverse section of the tooth of the cutter. Also, while the washers shown have end surfaces which are perpendicular to the axes thereof, it will be appreciated that if desired, the washers could be specially formed so that the openings 24 therethrough could extend obliquely through the washers, which would require the washers to be in exact angular relationship with respect to the pin 26 in the assembled cutter. Washers of this type could of course be produced by cutting lengths of tubing obliquely at an angle corresponding to the helix angle of the gear tooth with which they are to be associated. This however, is a more expensive operation resulting in a more expensive cutter and is not necessary in the ordinary case. A cutter of this type is indicated generally in Figure 5 in which the washer 40 is of the type referred to.

The cutter, after the assembly of the washers 22 therein and the peening or staking of the pins 26, may be finish ground to final desired operating profile as is well understood in the art.

As a result of the present invention the cutters are provided with cutting edges 30 and 32 which result from the intersection of two ground surfaces, namely the tooth surface 34 and the side walls 36 and 38 of the slots 14. This results in the production of very desirable cutting edges which are accurate inasmuch as they result from the intersection of two accurately ground surfaces. The cutting edges thus provided are accurate as to included angle and this accuracy is maintained throughout subsequent regrinding of the cutter.

The drawings and the foregoing specification constitute a description of the improved built-up gear shaving cutters in such full, clear, concise and exact terms as to enable any person skilled in the art to practice the invention, the scope of which is indicated by the appended claims.

What I claim as my invention is:

1. A gear shaving cutter comprising an integral unitary body of substantial circular shape having a series of peripheral gear-like teeth integral therewith, said teeth being provided with transverse slots extending inwardly from the crests thereof to substantially full tooth depth which separate each tooth into a plurality of tooth-like blades connected to said body only at their root portions, the blades of each tooth having aligned holes extending therethrough substantially centrally thereof, washers intermediate each adjacent pair of blades, and an elongated pin extending through the aligned holes of all the blades of each tooth and the washers therebetween, said pins being rigidly secured at their ends to the end blades of said teeth.

2. A cutter as defined in claim 1 in which said washers are of circular cross-section.

3. A cutter as defined in claim 2 in which said teeth are helical, and in which said washers have enlarged central holes to provide for passage of said pins therethrough obliquely.

4. A cutter as defined in claim 1 in which said teeth are helical, and in which the tooth profile surfaces of the blades of each tooth occupy a continuous helicoidal surface.

5. A cutter as defined in claim 1 in which the surfaces of said slots are ground surfaces and the tooth profile surfaces of said blades are ground surfaces, whereby the cutting edges at the corners of said blades are produced by the intersection of two ground surfaces.

6. A cutter as defined in claim 1 in which the slots have side walls perpendicular to the axis of the cutter.

7. A cutter as defined in claim 6 in which the corresponding slots in all teeth of the cutter occupy a plane perpendicular to the axis thereof.

8. A cutter as defined in claim 1 in which the slots in each tooth are spaced apart a distance such that the blades are relatively thin and flexible and require additional support in use.

References Cited in the file of this patent

UNITED STATES PATENTS

| Number | Name | Date |
| --- | --- | --- |
| 1,628,352 | Bonazzi | May 10, 1927 |
| 2,126,178 | Drummond | Aug. 9, 1938 |
| 2,164,642 | Drader | July 4, 1939 |
| 2,171,325 | Hawgood | Aug. 29, 1939 |
| 2,228,966 | Miller | Jan. 14, 1941 |
| 2,338,061 | Ross | Dec. 28, 1943 |
| 2,389,549 | Ross | Nov. 20, 1945 |

FOREIGN PATENTS

| Number | Country | Date |
| --- | --- | --- |
| 812,249 | France | May 3, 1937 |